Sept. 11, 1962 W. R. JOHNSON 3,053,941

MAGNETOSTRICTIVE TRANSDUCER FOR THE RECORDING AND REPRODUCING OF MAGNETIC INFORMATION

Filed May 5, 1958 4 Sheets-Sheet 1

INVENTOR.

WAYNE R. JOHNSON

BY

Lippincott, Smith & Ralls

ATTORNEYS

INVENTOR.
WAYNE R. JOHNSON
BY
Lippincott, Smith & Ralls
ATTORNEYS

INVENTOR.
WAYNE R. JOHNSON

BY

Lippincott, Smith & Ralls
ATTORNEYS

Sept. 11, 1962 W. R. JOHNSON 3,053,941

MAGNETOSTRICTIVE TRANSDUCER FOR THE RECORDING AND REPRODUCING OF MAGNETIC INFORMATION

Filed May 5, 1958 4 Sheets-Sheet 4

INVENTOR.
WAYNE R. JOHNSON

BY

Lippincott, Smith & Ralls
ATTORNEYS

United States Patent Office 3,053,941

Patented Sept. 11, 1962

3,053,941

MAGNETOSTRICTIVE TRANSDUCER FOR THE RECORDING AND REPRODUCING OF MAGNETIC INFORMATION

Wayne R. Johnson, Los Angeles, Calif., assignor to Minnesota Mining and Manufacturing Company, St. Paul, Minn., a corporation of Delaware Filed May 5, 1958, Ser. No. 733,165

26 Claims. (Cl. 179—100.2)

This invention relates to electromagnetic transducer heads for recording or reproducing magnetically recorded electric signals. It is particularly adapted to recording and reproduction of very high frequency signals or signals encompassing very wide wavebands, such as are required for the transmission of television signals, certain forms of telemetering signals, radar signals and the like.

The recording of such signals on a moving magnetic tape by the direct methods that have been used in the magnetic recording of sound has required very high relative speeds between recording or reproducing gap and the moving magnetic medium in order to be able to reproduce the high frequency component of the signal recorded. This has required very large and cumbersome reels of tape to record even a 15-minute television program, for example, and the mechanical complications have multiplied with the length of tape employed. In order to avoid the high speeds and the ensuing complications various means have been devised to divide the recording between a plurality of tracks by various sampling, modulating and frequency shifting or similar methods.

One of the most successful methods of reducing the tape speed has been to use multiple recording heads, movably mounted with respect to the tape which is itself moving in a different direction, thus to compound the motion of tape and of recording heads so that the relative speed of the tape and the recording aperture or gap in the transducer head is added vectorially. The signal is supplied to the various heads which engage the tape in succession so that as one head comes into engagement with the tape another is simultaneously leaving it. In the characteristic arrangement of this kind the transducer heads are mounted on a drum rotating on an axis in a plane parallel to the motion of the tape, this moving across the periphery of the drum parallel to the drum axis. This requires that the tape be distorted from its normal flat contour to a cylindrical form, the cylindrical axis being parallel to the drum axis, so that the rotating heads can engage it throughout substantially its entire width. This also involves complications.

In recording with the apparatus last described, the tape is progressed through the machine past the recording heads at a relatively very slow speed, while the peripheral velocity of the heads themselves is high. The head speed and the track speed are so coordinated that the tape moves a distance a little greater than the width of the track produced by the head during the time that any one head is in contact with the tape. Thus, for example, if each recording head produces on the tape a track that is one millimeter wide and it is desired that an equally wide guard-band separate each successive pair of tracks, if four heads are used the tape will be progressed 8 millimeters for each revolution of the recording drum. Assuming that the tape itself is, say, 50 millimeters wide (about 2 inches) theoretically this would reduce the tape speed required to record a complete television signal from about 400 inches per second to about 16 inches per second. Actually the saving is not this great; the system requires that the signals to be recorded be frequency-modulated on a signal several times as high in frequency as that of the signal itself, and the width of the gap used may be greater than those employed for direct recording. There is no actual saving in the area of tape required to record a given amount of information; it is, in fact, increased. Nevertheless, the greatly reduced diameter of the tape reels, resulting in a much lower moment of inertia, and the greatly reduced tape speed minimize inertial effects that have, in the past, resulted in some of the greatest difficulties in recording wide band signals and have made "transverse recordings" of this type very attractive.

The use of the transverse recording system, has, however, introduced difficulties of its own. Supplying the proper signal to multiple recording heads, exact spacing of those heads on a moving drum, the supply of signals through slip-rings without introducing interferent noise, the necessity for curving the tape into cylindrical form around a longitudinal axis as it passes the heads and flattening it out again on the take-up reels, as well as a multiplicity of mechanical details, each have presented their own particular problems of greater or less magnitude.

The broad object of the present invention is to provide means of recording and reproducing signals on an information memory in the form of a magnetic medium that maintains the advantages of the transverse recording system, but avoids difficulties heretofore encountered in the practice of such recording; i.e., to provide apparatus for effecting such recording that employs a single, stationary transducer head without moving contacts, one wherein the tape need not be laterally curved as it passes the transducer head, a system which is substantially self-synchronizing with respect to the pick-up of signals from successive transverse tracks across the tape, and, moreover, to provide apparatus which is capable of recording and reproducing signals modulated on higher carrier frequencies than have been heretofore practical and thereby extending recording capabilities of apparatus of this type to wider band widths than have been heretofore feasible.

While apparatus for employing the present invention embodies some differences from standard apparatus other than the transducer head itself, the head is the controlling feature of the apparatus and that to which the present specification is primarily directed, particularly since it is operative in connection with equipment which differs from conventional practice primarily in mechanical dimensions and tape speed.

The transducer head of the present invention comprises a tube of magnetostrictive material having a non-magnetic gap through the wall thereof extending longitudinally of the tube for sufficient distance to span the width of the tape to be used or, at least, that portion of its width that is to carry the broad-band signals for which the head is designed. A signal circuit is provided so disposed as to develop circumferential magnetic fields in the tube wall. Conveniently this may be a single-turn winding having one conductor extending longitudinally through the tube, although it is not necessarily so. The material of the tube may have either positive or negative magnetostrictive characteristics; whichever type of material is used, means are provided for stressing it in the direction that will render it easier to magnetize longitudinally and the stress is of sufficient magnitude to cause its permeability in the direction normal to the stress to fall nearly to unity. Thus, for example, if the material used for the tube is nickel, which exhibits negative magnetostriction, shortening when magnetized, it is stressed in compression whereas if the material employed has a positive magnetostrictive characteristic it is stressed in tension. When so stressed the circumferential permeability of the tube approaches unity while longitudinally small fields will carry it to saturation.

Means are provided at one end of the tube for exciting in it longitudinal elastic waves of pulse form and of the opposite sign to the stress applied to the tube; thus, if the tube is in compression, the pulse waves used are in tension, whereas if originally stressed in tension compressive waves are used. These waves are of sufficient magnitude to relieve the stress normally on the tube to a sufficient degree to make its circumferential permeability assume a relatively high value, and preferably reverse the stress locally. The tube that constitutes the head thus becomes, in effect, an acoustic transmission line down which the pulses are propagated. To prevent the reflection in the opposite direction means are provided for absorbing the pulses thus transmitted, the absorbent means being provided with a transformer section for matching its impedance with that of the line to which it is connected.

It will be seen that with this arrangement the signal coil is coupled with the tube, constituting the head, as a whole. The reluctance of the tube to circumferential magnetic fields is, however, high, except for the very short transverse "slice" where the stress is relaxed or reversed by the traveling wave. At this point reluctance is low. A relatively very powerful field is established across the gap at this point. In operation, periodical pulses are applied to the input end of the acoustic transmission line constituting the head at a repetition period that is equal to, or, preferably, very slightly shorter than the time required for the pulse to be propagated across the tape. The unstressed section of the line thus forms, in effect, a virtual recording gap that traverses the tape laterally at a very high speed; approximately, in the best magnetic materials for the purpose that are at present available, at approximately 15,800 feet per second, or, in terms of the line frequency presently used in television transmissions, about one foot per picture line. Using, for example, a two-inch tape, this is equivalent to six transverse tracks across the tape for each line of the television picture. The travelling wave is in this manner an enabling wave because signals can be recorded only at the position of the wave The tube is otherwise disabled due to the applied stress.

It has been found possible to excite pulses in the head of 0.1 microsecond duration. The elastic wave of relaxation of this pulse-length will traverse a distance of about 20 mils in this time; 20 mils, therefore, becomes the length of the effective recording gap formed by the pulse. It is well known that the response of a magnetic reproducer falls to zero at the frequency at which the wavelength of the signal, as recorded on the record, is equal to the effective length of the gap (the "absolute cut-off") and that good reproduction can be obtained when the recorded signal has a slightly longer wavelength than the effective gap length. Translated into terms of the present invention, the absolute cut-off frequency is that which completes one cycle during the time that the pulse persists; i.e., using a 0.1 microsecond pulse the absolute cut-off is in the neighborhood of 10 megacycles.

Two factors, however, combine to increase the frequency of the absolute cut-off to some extent. First, any pulse that can be generated satisfactorily has a finite rise-time, so that relaxation of the stress in the head does not change by a complete discontinuity of the curve but by gradual transition; actually, the waveform of the pulse will approach the sinusoidal. The transverse permeability therefore also changes from something approaching zero to a finite value by accelerating degrees and returns to minimum value in the same manner. The permanent magnetization imposed on the tape that forms the record does not vary linearly with the magnetomotive force applied, but has a threshold value below which the residual magnetism is small and above which it is relatively high. The effective length of the gap is proportional, therefore, not to the time between the first instant of application of the pulse and that at which the stress on the head is fully restored, but only to the portion of the time when the relaxation is sufficiently great to bring the magnetizing force above the threshold value. Absolute cut-off therefore occurs not at 10 megacycles, for a 0.1 microsecond pulse, but at a somewhat higher frequency, permitting the actual recording and reproduction of 10 megacycle waves.

Assuming 0.1 microsecond pulses, therefore, 10 megacycles may be considered to be the effective rather than the absolute cut-off. Further, there is no sharp line of demarcation that makes 0.1 microsecond the shortest pulse that can be produced; a 10 megacycle wave is high enough to be modulated satisfactorily by the four-megacycle, high-frequency cut-off of the television band and results in illustrative computations that are easy to handle.

A 20 mil gap is, of course, very long in comparison with those customarily used for the recording of very high frequencies, such as are employed in television. In accordance with the present invention, however, the width of the gap, parallel to the direction of motion of the tape, can be of the same order of magnitude as the lengths ordinarily used; i.e., approximately 1/10 mil. This dimension therefore becomes the actual width of the tracks placed across the tape by the virtual gap. Allowing for guard bands between each successive pair of tracks equal in width to the track itself, the tape need be advanced only 0.2 mil per traversal, or, with a two-inch tape, 1.2 mils per picture line. This is the equivalent of about 19 inches per second, although for reasons that will be discussed hereafter it may be desirable to narrow the guard-bands slightly and reduce the speed to, say, 15 inches per second. The actual area required for one second's recording at the 19 inch per second speed is 38 square inches, which compares favorably with other methods of recording. It is to be noted that the nature of the recording produced is different from that of a transversely moving head; the elementary magnets are arranged longitudinally of the tape instead of laterally and their poles are separated from those of adjacent magnets by the width of the guard-bands.

The description of a preferred form of the invention which follows, and some further explanation of its theory of operation are illustrated by the accompanying drawings wherein.

Figure 7:
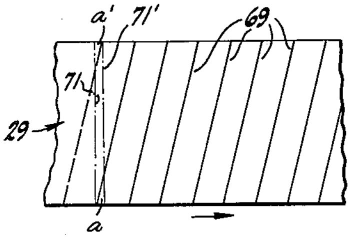
Figure 8:
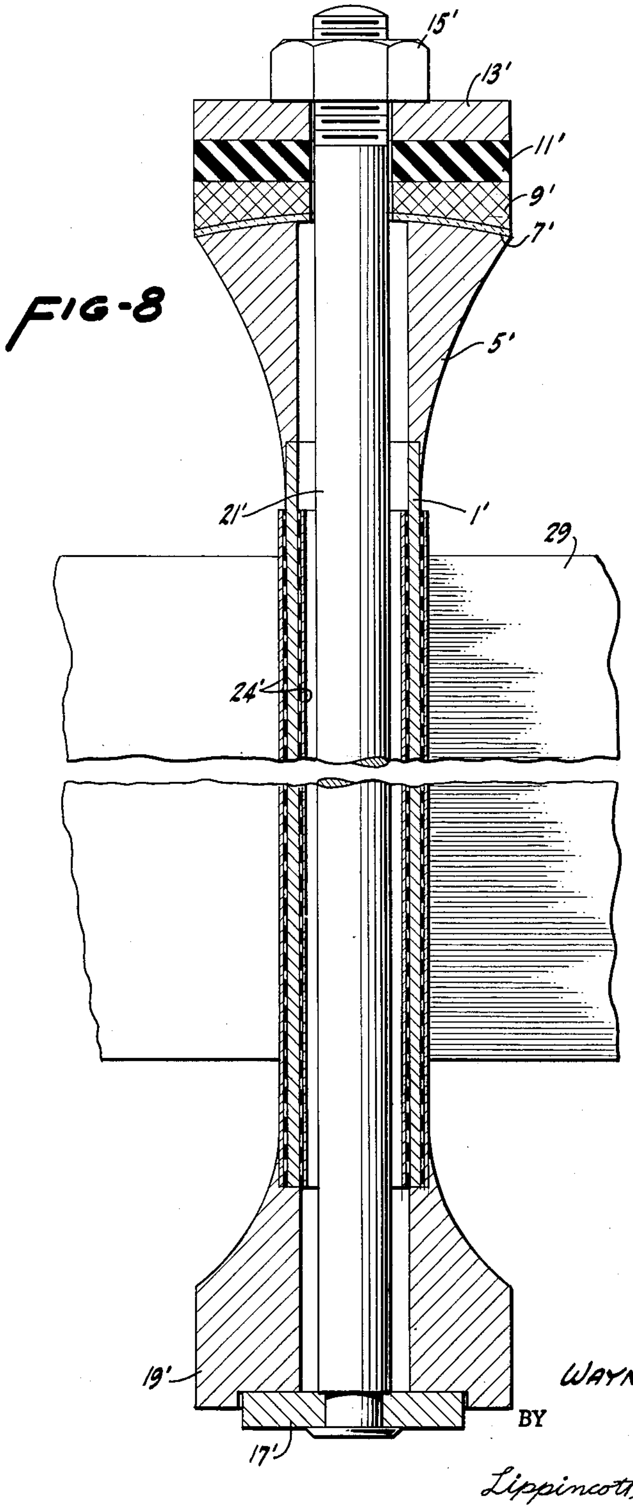

FIG. 7 is a diagrammatic representation of a section of recording tape illustrating, on an exaggerated scale, the relative positions of successive tracks with respect to the instantaneous position of the slit forming the recording gaps and the virtual gaps formed therealong by successive pulses; and FIG. 8 is a longitudinal cross-sectional view of a modified form of transducer head, employing a negative magnetostrictive material.

Figures 1, 2:
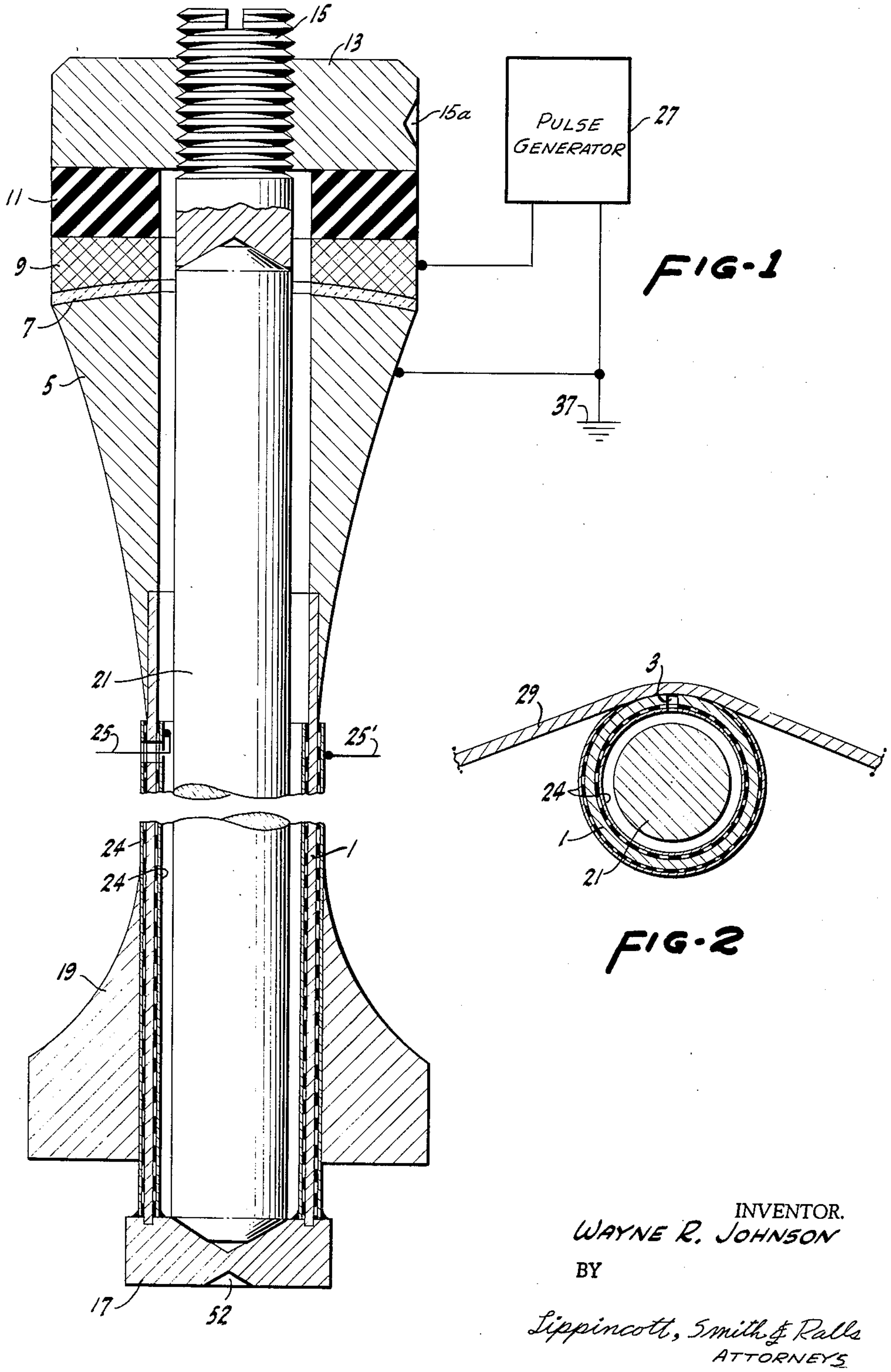
FIG. 1 is a longitudinal sectional view of one form of recording head in accordance with the present invention, showing the connections thereto.
FIG. 2 is a transverse sectional view through the head of FIG. 1, showing the relation of the recording gap to the recording tape.

The structure of a preferred form of recording head embodying the present invention is illustrated in the longitudinal cross-sectional view of FIG. 1 and the transverse sectional view, on a much larger scale, of FIG. 2. The active element of the head shown is a tube 1 of a positive magnetostrictive material, i.e., a material that elongates when magnetized in the direction of the magnetic field induced in it. Numerous such materials are known, most of them alloys; the material of choice is that which exhibits the greatest proportional elongation when magnetized to saturation and fairly high permeability when unstressed. The best material found to date for the purpose is that sold under the designation "Permalloy 68," but other materials exhibiting this combination of properties to a lesser degree are quite usable.

The material of tube 1 is preferably of only a few mils in thickness. Conveniently it may be made of Permalloy tape, rolled in cylindrical form about a longitudinal axis, with its edges abutted and hydrogen-brazed to form an extremely narrow, nonmagnetic gap 3 extending through the wall thereof, a thin layer (0.1 mil approximately) of copper or other nonmagnetic brazing material between the edges of the tape constituting the gap. Preferably the gap is accurately parallel to the axis, but very slight deviations can be tolerated and compensated for by adjustments of the apparatus wherein the head is mounted. The tube thus formed is the acoustic transmission line whereby the signals are recorded or reproduced, as the case may be.

At one end of the tube, hereinafter referred to as the input end, it connects to an impedance-matching or acoustic transformer section 5. This section preferably has an inside diameter equal to that of the tube. Its outer diameter flares away from the tube, preferably following an exponential curve. The section 5 is made of nonmagnetic material, such as stainless steel, having a density and elasitance approximating that of the tube material. It is brazed to the end of the tube 1, the latter preferably entering a counterbore in the section 5 which extends a short distance over the tube in a feather edge, as shown in the drawing.

The matching section abuts and is secured to a layer of piezoelectric crystal 7, which serves to generate the elastic pluses to be transmitted along the tube. This crystal can be quartz, or, preferably, barium titanate. In order to secure it to section 5 it may first be silverplated with a tightly adherent coating and then either hard or soft soldered to the section 5, hard solder being preferred because of its greater elasticity.

The other side of the crystal 7 is similarly attached to an annulus 9 of a material that has an acoustic impedance that is as high as or higher than that of the section 5; thus, it may be of steel, gold, gold-platinum alloy, platinum or tungsten, these materials being listed in the order of their acoustic impedances. The function of this annulus is to act as a buttress against which the crystal can act to deliver the energy of the pulses developed by it to the acoustic line. The thickness of the annulus is preferably from ¼ to ½ wavelength of the pulse in the material employed; from 0.005 to 0.010 inch, approximately, for any of the materials mentioned.

The annulus 9 is backed, in turn, by an annulus 11 of insulating material having a much lower acoustic impedance and preferably a relatively high internal friction, making it a good absorber of sound. Semi-soft rubber, natural or synthetic, is at present preferred. It may be vulcanized or cemented to the annulus 9.

Finally, the absorbent annulus 11 is similarly secured to a metal cap or nut 13 which is internally threaded to receive an adjusting screw 15.

The important characteristic of each of the bonds between the tube 1, transformer section 5, crystal 7, and two annuli 9 and 11 and the cap 13, is that they be reasonably strong in tension, sufficiently so to withstand a total tension of several kilograms weight.

At the opposite end of the tube 1 there are located another cap and means for absorbing the pulses transmitted along the line to prevent their reflection back toward the input end. These means may take the form of an assembly substantially identical with that of the input end, which will absorb the waves electrically. The arrangement shown, however, comprises a cap 17 brazed to the end of the tube, the function of which is merely to transfer the biasing stress to the tube walls, and a separate sound absorber 19. This may be made of lead sweated to the tube (which is at present preferred) but it may also be of semi-soft rubber, tightly bonded to the tube and of longer relative dimension than that illustrated.

In either case it is bonded to the tube 1 by soldering, cementing, or vulcanizing as the case may be. Preferably it is tapered toward the input side of the line; preferably, too, the taper follows an exponential curve to form an impedance-matching section.

The entire structure, as thus far described, is placed in tension by means of a strut 21, extending longitudinally through the tube 1 and bearing, at the input end, in a conical depression formed in the inner end of the adjusting screw 15, and at the receiving end of the line against a similar depression in the cap 17. Preferably the material of the strut has approximately the same coefficient of thermal expansion as has the tube 1 itself, so that variations in ambient temperature in which the head is operated will not materially affect the tension applied to the tube, but this is not of paramount important since the apparatus has sufficient tolerance in its adjustments to absorb the degree of variation that is likely in indoor ambient temperatures.

The walls of the tube are enveloped by a signal "winding," the conductors whereof extend longitudinally within and without the tube. There are several ways in which this winding can be applied. Preferably it should be as closely coupled with the magnetic material of the tube itself as possible. In the present instance it is a single turn, the conductors whereof are plated directly onto the tube. In order to do this and to insulate the winding from the tube it is first given a coat, inside and out, of a good insulating material such as aluminum oxide. This may be accomplished by first plating with a film of aluminum and then anodizing the latter. A second, heavier coat of aluminum, copper, or silver, is then deposited over the anodized layer. These coatings are too thin to illustrate satisfactorily; the conductive layer is represented by the more heavily outlined portion 24 of the tube. The winding is interrupted, inside and out, before reaching the matching-section 5. One signal lead, 25, is brought into the interior of the tube through a small hole in the side and connected to the coating on the interior wall. The other input lead 25' is connected to the exterior conductor. The internal and external coatings are connected through the cap 17.

It will be recognized that there are various other ways of applying the winding. One that immediately suggests itself is to make strut 21 the internal conductor, connecting to an outer conductor that closely encircles but does not contact the ube 21. This is a somewhat easier solution than the plated-on winding but the coupling with the magnetic head is not as close. It is not necessary to apply any of the layers that constitute the winding after the tube is formed; they can be applied to the flat tape, leaving an uncoated margin at each edge (so that the windings will not be shorted when the tube is brazed) but carrying the coatings to the end of the tube where they will be connected when the cap 17 is brazed in place. Copper or silver can, of course, be used for the conductive layer that forms the winding and it has the advantage that it is easier to solder to the connections 25 and 25'.

If the plated-on form of winding is used, it will affect the propagation constants of elastic waves through the tube. Even though the coatings are very thin in comparison with the tube walls they nonetheless act as loading, slowing down the elastic waves slightly in their propagation along the tube. This is an advantage rather than a disadvantage; it shortens the wavelengths of waves propagated along the tubes slightly, and therefore increases the amount of information that can be recorded in a given area of tape. It also increases, to a slight degree, the attenuation of the waves as they progress down the acoustic line, and this could impose an amplitude modulation upon the currents in the signal circuit. As these signals are preferably frequency-modulated in any event and will therefore ordinarily be limited to remove any amplitude modulation from them the amount of attenuation introduced into a line of only a few inches in length is not usually of any material importance.

The impedance of the single-turn signal winding is, of course, very low in spite of the relatively large amount of magnetic material in its circuit, since it is only in the immediate neighborhood of the pulse that the permeability of this material is materially greater than unity. It is for this reason that the relatively large capacity between the inner and outer conductors of a plated-on signal winding can be tolerated. The two capacities, in series, are shunted across the input inductance of the coil and could, under certain circumstances, effectively short circuit the input voltage or at least form a relatively high-admittance bypass. If, however, the admittance of the two capacities in series is lower than the inductive admittance of the coil, in the neighborhood of the carrier frequency, they can actually increase the circulating currents in the coil, raise its input impedance and make the device more effective. The ideal situation would, of course, be that which would obtain if the coil were resonant to the carrier frequency, provided, of course, that the resonance peak were fairly broad so as to be substantially flat over the range of frequencies through which the carrier is modulated. If the capacities are formed by an anodized coat this would in all probability be the case, since this type of coat results in a somewhat lossy dielectric. In the apparatus described, the resonant frequency of the combination was well below that of the carrier employed. The amplitude modulation resulting from using a parallel resonant circuit off-resonance was not sufficient to be of any major importance, being eliminated by the limiters. In the event that the head is to be used in circuits where the shunting capacities became troublesome, it would be preferable to sacrifice the close coupling of the plated coil and use a coil comprising the inner strut and an outer tubing as described above.

In view of the general theory of operation that has already been given, the operation of the device as such should be fairly obvious, but there are some points that may need further exposition. The adjusting screw 15 is tightened sufficiently to impose a stress of a few kilograms between the inner strut and the outer structure, placing the former in compression and the latter in tension. As it affects the various junctions between the transformer section 5 and the cap 13, all of the same area, the unit stress is not large: a fraction of a kilogram per square millimeter. As transferred through the section 5 to the tube 1, however, the unit stress rises rapidly, to a value of, say, two kilograms per square millimeter cross-section in the tube walls. The actual value of this stress, of course, depends upon the adjustment of the screw 15 and it is maintained at a substantially constant value by the elasticity of the parts. It should, of course, be well below the elastic limit of the tube 1 and the sound absorber 9. As there is obviously no easy way of measuring its actual value, in practice its best value is found by observation and adjustment as will later be described.

The pulses that are to be transmitted down the tube are developed by piezoelectric crystal 7 in response to voltage pulses developed by pulse generator 27. These pulses are preferably of 0.1 microsecond duration or less, and have a repetition period slightly less than is required to transmit the acoustic pulse across the tape, the position of the latter in operation being indicated by the short section 29 thereof, as shown in FIG. 8. Circuitry for generating such electric pulses, at any desired repetition frequency, has been developed in connection with radar equipment of various types, and it is not believed necessary to describe here the particular equipment used, since it can take numerous forms. The pulse generator is connected to the crystal terminals, through transition section 5 and the annulus 9, respectively. Crystal 7 is cut with its axis so oriented that it will expand, parallel to the axis of the head, when potentials of one polarity are applied across it and contract in the same direction in response to potentials of opposite polarity. The pulses are applied unidirectionally in the proper polarity as to cause expansion of the crystal in the dimension longitudinal to the tube.

The crystal, being normally under tension, its sudden expansion results in a relaxation wave or, if the expansion is sufficiently great, an actual compression wave, which is propagated in both directions from the two faces of the crystal.

The energy of the waves so developed is divided between the transformer section 5 and annulus 9 in inverse proportion to the characteristic acoustic impedances of the materials used. If the annulus is of steel the pulse energy divides equally, one half going into the line, the other half into the annulus, to be dissipated as will be described below; if of tungsten, about 69% goes into the line and 31% into the annulus, an improvement of about 1.3 db.

The compression wave enters the line from the crystal face as a local change in the total stress effective on the material. As it is propagated down the decreasing cross-sectional area of the transformer section 5 the change in unit stress increases to a maximum where the wave reaches the constant cross section of the tube 1. When the wave reaches the absorber 19, tightly bonded to the tube, the change in dimension (strain) that accompanies the change in stress deforms the absorber and since the elastance of the latter is very small the wave energy is dissipated as internal work, instead of being returned to the tube. Any energy that does remain in the wave reaching the far end of the absorber is largely reflected at the sudden mismatch there and further attenuated before re-entering the line. The tapering of the input end of the absorber prevents any material reflection at that point. Therefore, substantially no reverse wave is present from this source to interfere with the compression wave that travels down the tube to form the virtual recording gap.

Figure 3:
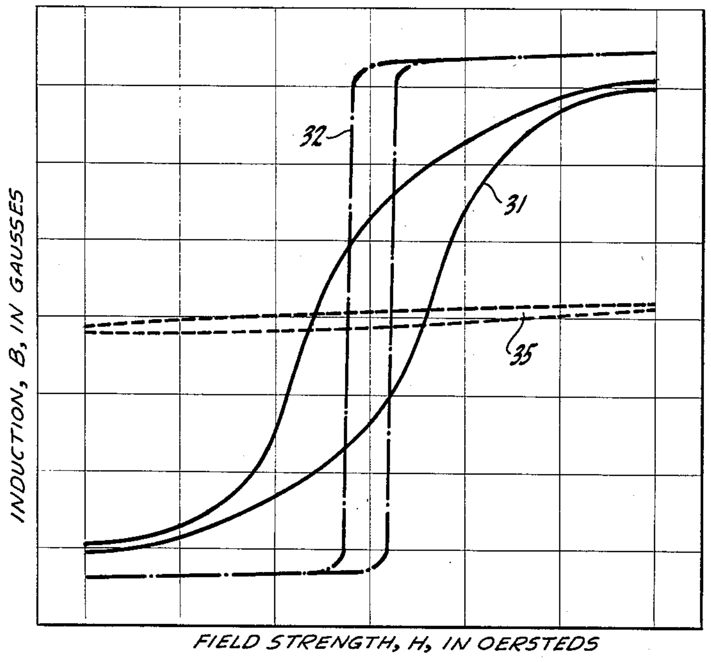
FIG. 3 is a B—H diagram illustrating hysteresis loops of positive and negative magnetostrictive material under stress.

The effect of the stresses applied to the head are best illustrated by the hysteresis loops shown in FIG. 3. In this figure the loop 31 is that of unstressed Permalloy 68 and its slope can be taken as representing either the longitudinal or circumferential permeability of the tube. Stressing the tube longitudinally, to an amount less than its elastic limit, changes the shape of the loop drastically. In the direction of the tension the B—H curve takes the form of a loop 32; it becomes nearly rectangular in form with a very steep and nearly constant slope almost to the point of saturation. Circumferentially, however, the effect of the tension is substantially the opposite; the slope of the permeability curve approaches zero; to the circumferential fields induced by the signal winding, the material acts almost as though it were non-magnetic.

Compression on the tube has the opposite effect. With the same unit compressional stress, curve 32 represents the circumferential premeability and curve 35 the longitudinal.

Increasing the tensional stress on the tube narrows and steepens the longitudinal hysteresis loop and flattens the circumferential loop. The reverse is true in the case of compressional stresses.

Assuming that the loops 32 and 35 represent the condition of the tube under the biasing stress employed in normal operation, a relaxation of this stress to zero results in a gradual merger of the loops 33 and 35 to the form of loop 31.

The best adjustment of the head is that at which (1) the biasing tension normally applied to the tube is great enough so that maximum signal currents do not create sufficient circumferential induction to raise the magnetomotive force effective across the recording gap above the threshold of the magnetic material on the tape, and (2) the tension is low enough so that the compression waves generated by the crystal pulses are sufficiently powerful to permit the induction at any point reached by the wave to bring the magnetomotive force across the gap well above that threshold. Recordings can be made if the differential mmf across the gap is only in the ratio of 2:1. A wave much less powerful than that required to give complete relaxation of stress at its crest will accomplish this. Obviously, however, it is desirable that the change in effective permeability be as great as possible; it would be desirable if the directional permeabilities could be completely reversed. Whether this can be done or not depends upon the initial tension on the tube 1 and the amplitude of the pulse transmitted along it; the latter, in turn, depending upon the rate of change of dimension of the crystal in response to the electrical pulse applied to it, i.e., to its amplitude and rise times.

To at least a first approximation, the change of dimension of the crystal is proportional to the voltage across it. This voltage must be kept below a value that would either cause electrical breakdown or would so stress the crystal mechanically as to cause its rupture. The intensity of the elastic pulses that can safely be generated can therefore be increased by increasing the thickness of the driving crystal, so as to maintain unit stresses across it within safe limits. There is, of course, a limit to the voltages that can conveniently be handled.

The various parameters that affect the recording are therefore related in a somewhat complicated manner. Ultimately the controlling factors are two: the intensity of the pulse that can be generated and the threshold of the magnetic material on the tape. To obtain the best signal-to-noise ratio, in recording particularly and to a somewhat less extent in reproduction, it may be desirable to reduce the signal amplitude to a point where it will not record appreciably under a fairly moderate tension on the tube of the head if, by so doing, it becomes possible to reverse the stress and thus greatly increase the circumferential permeability of the tube 1.

Because, however, the device is customarily used with frequency modulated waves, which are fairly resistant to interferent noise the device is operative even when the conditions are very far from ideal. Reasonably satisfactory reproduction can be obtained even though the tension is not completely relaxed by the passing wave.

Reverting now to the elastic waves transmitted away from the line into the annulus 9, if the material of the annulus is of gold or platinum having low elasitance, the energy of the waves may be absorbed by internal friction, as in the case of the absorber 19, although to accomplish this the annulus should be somewhat thicker than that described. Furthermore, the constant swaging action of the crystal may result in cold flow of these soft metals. Gold-platinum alloys, such as are used in dentistry, can be obtained in a wide range of malleabilities and elasticity. It is therefore possible to select one of these which will absorb the waves without permanent deformation.

Although this method of preventing spurious pulses from being reflected back into the line is a practical one and is contemplated as being within the scope of this invention, the use of steel of tungsten annuli prevents reflected waves from interfering with the operation of the head in a different manner.

The rubber annulus 11 has an acoustic impedance that is very low in comparison with that of the annulus 9. Therefore only a small part of the energy of the wave is transmitted past the impedance mis-match; what is so transmitted is dissipated in internal friction in the rubber.

The major portion of the energy of the wave is reflected from the interface but with its phase reversed; it is returned toward the crystal as a tension wave instead of a compression wave.

Assuming the annulus 9 to be of steel and that the effective acoustic impedance of the crystal is matched to its load and its electrical impedance to that of the pulse generator 27, it will be seen that the crystal feeds the acoustic impedances of its two faces in parallel; by reciprocity, looking into the crystal from the annulus 9 the impedances of crystal and line are also effectively in parallel and offer an acoustic impedance one-third that of the annulus. One-quarter of the energy of the reflected wave is therefore transmitted to the crystal and line, three-quarters are re-reflected toward the rubber annulus.

Of the one-fourth transmitted, the energy divides between the crystal and the line inversely as their impedances; two-thirds goes to the crystal to be absorbed electrically in the pulse generator; the remaining one-third, or one-twelfth of the energy of the original wave going into the line as a tension wave, nearly 11 db down from the original compression wave. Because, however, the tension on the head is already sufficient to reduce the circumferential permeability nearly to unity, the additional tension of the wave has no appreciable effect. It is absorbed at the far end of the line in the same manner as the original pulse.

The energy reflected from the interface between the crystal and the annulus 9 is again reversed in phase, so that it again reaches the rubber annulus as a compression wave and the process repeats. Not counting energy loss to the rubber annulus the wave is attenuated 1.25 db at each reflection from the crystal face, these reflections recurring (since the annulus 9 is about one-half of the pulse wavelength thick) about 0.1 microsecond. Since the pulse repetition period is, by postulate, one-sixth of the picture-line rate, or 9.46 microseconds, it will be attenuated by about 117 db before the next pulse occurs, while that reaching the line will be an additional 11 db down or 128 db below the initial pulse level, much too small to cause any appreciable effect.

If the annulus 9 is of tungsten, giving a greater mismatch to deliver more of the pulse energy to the line, the crystal impedance still matching the line and annulus impedances in parallel, the attenuation per reflection within the annulus will be much lower—about one-half db per reflection. Moreover, the percentage of the energy absorbed by the crystal will be less. It comes out that the attenuation in the tension pulses transmitted to the line just prior to a succeeding compression pulse is about 60 db, which should be ample. If not, however, the thickness of the annulus 9 may be made less; the minimum is about one-fourth of a pulse wavelength, which would double the number of reflections between compression pulses and hence double the attenuation in db.

It will be realized that exact impedance matching—electrical, electro-mechanical and acoustic—may not be possible. Any such mismatch will disturb the numerical results here given but will not affect the principles involved.

If such mismatch does exist its most likely manifestation is a tendency of the crystal to "ring" following each pulse. If this occurs the best thickness for the annulus 9 is one-quarter wavelength of the natural frequency of the crystal. By analogy to an open quarter-wave resonant transmission line this acts as to "short-circuit" all except the initial transient pulse.

The rubber annulus 11, although it does enter into the process of absorbing the backwardly transmitted waves, has two additional functions as well. First, its compliance, introduced between the crystal and the tensioning screw 15, renders the adjustments of the latter much less critical. This same effect could, of course, be secured by introducing a compression spring between the adjusting screw and the strut 21. Its other function is to prevent short-circuiting or partial short-circuiting of the electrical pulses applied to the crystal, through the head itself. For pulses as short as 0.1 microsecond such short-circuiting would only be partial at worst, and like the function of adding compliance the additional insulation could be supplied by making the cap 13 of insulating material instead of metal.

It is obviously preferable that the head as a whole be operated at ground potential and that as small a part of the equipment as is reasonably possible should be operated "hot." In operation it is effectively the center of the voice coil 24, at the lower cap 17, that is grounded. Pulses from the generator to the head will ordinarily be supplied through coaxial cable, the sheath itself being grounded and connected to the section 5 of the head; if there is any effective voltage induced between the center of the signal coil and the point of connection to the grounded sheath of the coaxial cable such transmitted wave as might exist has substanially equal effect on the two ends of the voice coil and therefore substantially cancels out. Any coupling through the capacitance of the condenser formed between the parts, with the annulus 11 as a dielectric, also connects back to the midpoint of the voice coil through the strut 21.

Using only the normal precautions employed in equipment of this general class, no troubles from cross-talk between the driving pulses and the signal circuit should be experienced.

In the installation and use of the device there are two primary precautions to be observed. The first is that the gap be either truly normal to the direction of motion of the tape or, if not, that the angle of deviation from the normal be small and the same in both recording and reproducing instruments. If recording and reproduction are accomplished on the same apparatus the latter possibility is automatically taken care of, unless adjustments have been disturbed between the two operations. If different apparatus is to be used for the two operations, it is practically necessary that means be provided for adjusting the gaps in the two equipments to parallelism. The second requirement is that the points of support of the head contact it at points that will not interfere with the propagation of waves along the head, either tending to damp them out or to cause reflections.

Figure 5:
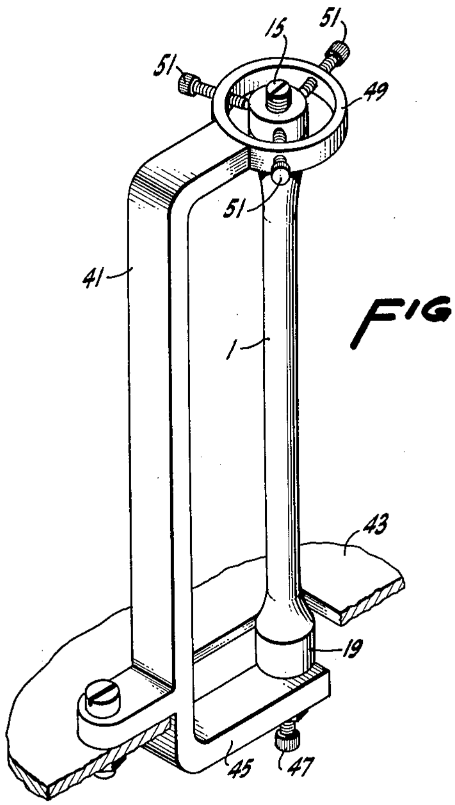
FIG. 5 is an isometric view of one form of mounting for the head of FIG. 1.

The support of FIG. 5 is a very simple one that meets these necessary conditions. In this figure a support bracket 41 is shown as rigidly secured to panel 43 on which the tape transport equipment is mounted, the panel preferably being apertured to admit the lower portion of the bracket so that the tape transport itself is close to the panel. The bracket has a lower arm 45 extending outwardly from its support, that carries a pivot-pointed adjustment screw 47. The upper arm of the bracket comprises a ring 49 centered immediately above the adjusting screw 47. Three leveling screws 51, mounted equidistantly around the ring 49, project inwardly. They are so spaced as to bear against the cap 13 on the recording head, engaging conical seats **15*a* shown in FIGURE 1, which are similar to the seat 52 in the lower cap 17 which receives the point of the screw 47**.

More elaborate brackets will give greater convenience of operation. That illustrated is chosen for the purpose only because it is the simplest to describe and is adequate, the bracket for the support of the head not being directly related to the head itself, which is the subject matter of the present specification.

Adjusting screws 51 permit the positioning of the gap 3 so that it is truly perpendicular to the plane of the panel 43 and the direction of travel of the tape, provided that the gap itself is strictly parallel to the axis of the tube 1. They also permit adjustment of the gap so that it is perpendicular to the motion of the tape even if there is a slight deviation from parallelism in the gap; as will be seen from the position of the tape as shown in FIG. 2, it is not truly tangent to the recording head but contacts the cylindrical body of the head through a slight arc. By tilting the head to a minute degree, the line of contact between the slightly skewed head and the tape can be so compensated that it is truly perpendicular to the edge of the tape and to the tape travel.

Figure 4:
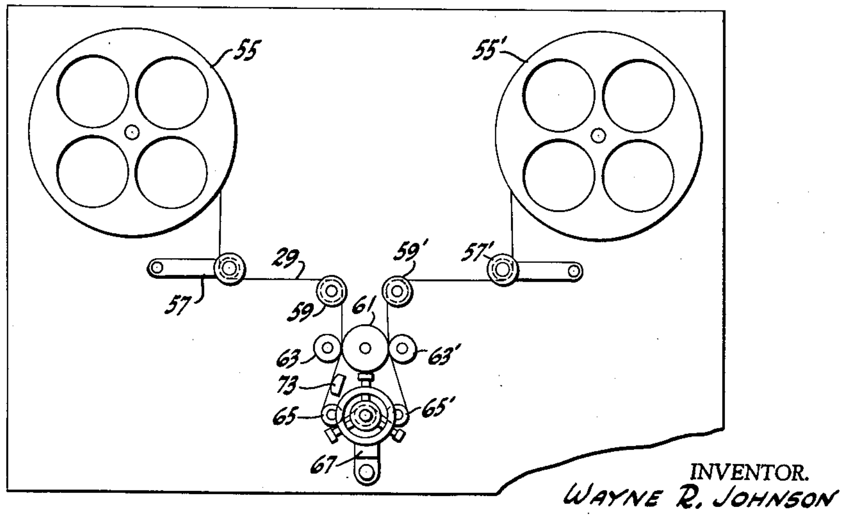
FIG. 4 is a schematic diagram of equipment for progressing a tape past the head.

The general layout of a recording and reproducing apparatus employing a transducer head of the type described is illustrated in highly diagrammatic form in FIG. 4. This figure is considered adequate since except for the structure of the head itself and the dimensions of the apparatus, to use wider tape on smaller diameter reels, it is substantially conventional. Initially the tape is mounted on a pay-out reel 55 and rewound on the take-up reel 55'. Preferably the tape is tensioned by individual motors, driving the pay-out and take-up reels respectively. Leaving the pay-out reel, the tape passes over a spring-actuated tensioning arm, 57, about which it turns at substantially a right angle to pass over a guide post or roller 59. Here it again makes a right angle turn to pass between the drive capstan 61 and a rubber nip-roller 63 and thence to another guide post or roller 65, so placed that it directs the tape over the transducer head 67 at the proper angle. After leaving the head it passes along a path that is substantially the mirror image of its path from the pay-out roller to the head, over guide 65', under nip roller 63', guide 59' and tension arm 57' and so to take-up reel 55'. This is one form of tight-loop drive; except for dimensions it is identical with other tight-loop drives previously known. With such a drive the speed of the tape is strictly dependent upon the peripheral speed of the capstan, which is driven by a controlled speed motor.

The arrangement is shown only for convenience and as a background against which the performance of the head itself can be understood and its advantages recognized.

In making recordings with heads of the type here shown the tracks traced upon the moving tape are slanted slightly across the tape, due to the composition of motion of the virtual gap transversely across the tape with the physical motion of the tape itself, at right angles thereto. Under the conditions of operation previously assumed, the tape advances only $\frac{2}{10}$ mil while the virtual gap travels approximately two inches (the exact distance being determined by the rate of propagation of the elastic wave in the head) or 1.2 mils tape advance per foot travel of the virtual gap along the tracks. Taking these figures as exact, for purposes of illustration, let is be assumed that the tape is so synchronized with a television picture to be recorded upon it as to produce six tracks across the tape per line of the television picture.

Under these circumstances the blanking signal which is transmitted at the end of each line can be made to occur at the beginning of every sixth line of the recording; to produce one whole picture line each of the six tracks would need be but two inches long and this could be the total width of the tape. Preferably, however, the tape is made slightly wider than this, e.g., 2¼ inches wide, the gap in the head itself being long enough to accommodate substantially this full width. The rate of advance of the tape is, however, maintained at a speed of advance of 1.2 mils per line. Furthermore, the pulses are uniformly spaced at six times the line repetition frequency. The result of this arrangement is that a new pulse is started on its way along the head before the preceding pulse has quite reached the end of the line to be absorbed there. It follows that there is a measure of overlapping of succeeding tracks, the same information being recorded at the upper edge of the tape on one track is also simultaneously recorded on the lower edge of the tape on the preceding track.

There will be no time during the operation of the device when the gap does not cross at least one track. If in reproduction, pulses are initiated at the same intervals as in recording, all of the information on the track will be reproduced provided each pulse is started on its way at the instant the reproducing gap first engages the track. If the pulse of the receiving equipment is started on the input end of the head at the instant the upper end of the gap is halfway between the tracks, nothing will be picked up except, perhaps, some garbled cross-talk from two tracks.

What happens may be better understood by reference to FIG. 7, which shows the relative arrangement of tracks and recording gap with respect to the tape on a greatly exaggerated scale, the slope of the tracks and their degree of separation both being increased to make them visible in the drawings. In this figure the solid diagonal lines 69 represent tracks already recorded on the tape 70. Vertical line 71 represents the instantaneous position of the physical recording gap at the instant when the virtual gap from a preceding pulse is just leaving the last complete track 69. The pulse last generated entered the head when the recording gap occupied the position of the dotted vertical line 71'. The same information is therefore recorded on the short sections of the two successive tracks designated as *a* and *a'* respectively. No information can therefore be lost.

It is possible, however, that owing to changes in dimension of the tape, because of moisture absorption or thermal expansion or contraction, there may be a disparity in phase between the signals picked up simultaneously by the two virtual gaps in the head. Because the change of dimension will usually be very small, measured in fact in fractional mils, this is not ordinarily important. The visual effects of such phase discrepancy are a function of rate-of-change of phase as the pulse last to be generated enters the line and it can be shown that for a given gap-length this is a constant, irrespective of the frequency of transmission.

In the event that the phase modulation thus introduced becomes great enough to cause any serious imperfection in a reproduced picture, however, the change of phase can be spread over the entire distance of overlap of the recordings of two successive pulses. For example, it is possible partially to erase the tracks recorded on the two edges of the tape, the erasure being substantially complete at each extreme edge and fading out to zero one-quarter inch from the edge, if this is a degree of overlap. Assuming the effective length of the virtual gap is 20 mils, the transition from the leading to the trailing gap would then be equivalent to 12½ wavelengths of a wave of "absolute cut-off" frequency, 10 megacycles. A one mil change in tape widths would be the equivalent of an 18 degree change in phase at this frequency and by distributing this discrepancy over 12½ cycles the change become less than a degree and a half per cycle and unnoticeable in the over-all effect. Arrangements for accomplishing this are the subject matter for another patent application and it is mentioned here merely to show that such changes in dimension are not a serious defect if the overlapping of the pulses is provided for. If the tape is maintained under conditions of substantially constant temperature and humidity, however, even this is unnecessary.

In order to reproduce recorded signals, however, it is necessary that the tape speed and position be accurately coordinated with the pulse repetition rate. It will be obvious that even though the tape is being advanced with the proper speed, if the pulse starts down the head at a point midway between two tracks it will travel midway between them and pick up nothing but cross-talk, if anything. Registration between tape position and pulse generation can be accomplished by means of a servo system that differs only slightly from those that may be employed in direct recording. Such a system is shown in greatly simplified form in FIG. 6.

Although it is possible to record and reproduce the pilot signals, through which registration between the recording head and tracks is secured, from the video head that carries the main information, it is somewhat simpler to utilize a separate head (or heads) engaging the edge of the track. The pilot head for this purpose can be located anywhere within the tight loop of the tape that extends between the nip rollers 63 and 63'; in the diagram the pilot head is shown as leading the video head, at 73 of FIG. 4.

Figure 6:
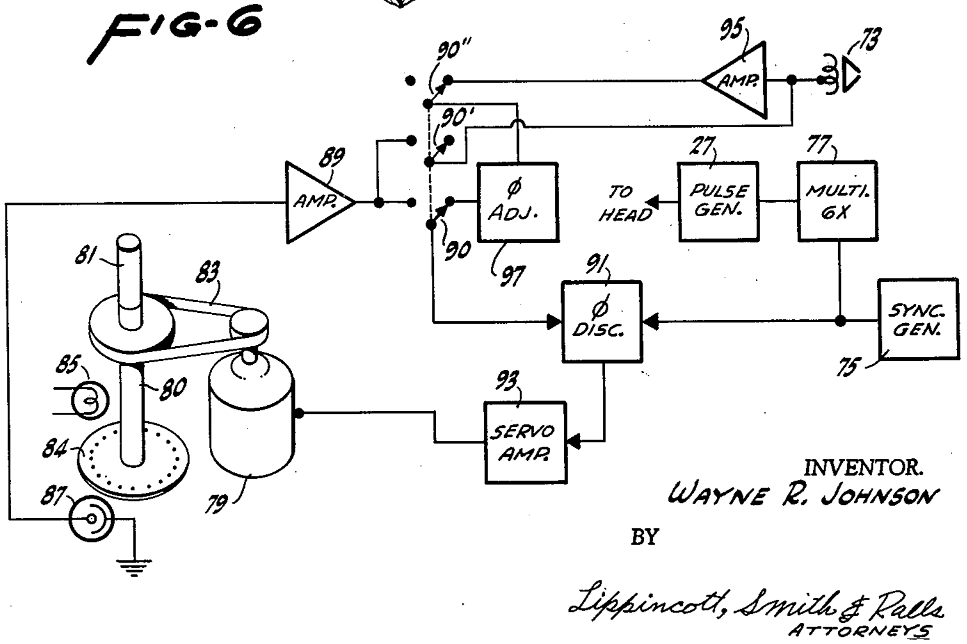
FIG. 6 is a block diagram showing one arrangement for synchronizing pulsing and tape drive.

Tape speed, in both recording and playback, is governed by line frequency pulses from the sync generator 75 of FIG. 6, these pulses going to a multiplier 77 that steps up the frequency six-fold and feeds the higher frequency pulse generator 27, as has already been described. The line frequency from the same source is used to control the motor speed as will next be described.

The motor here used is a D.C. motor 79 which drives the shaft 80, that carries the capstan 81, through a belt 83.

Mounted on the capstan shaft is a tachometer disc 84 near the periphery of which is a row of equally spaced apertures. Light from a suitable source 85 falls through these apertures upon a photocell 87, thereby generating alternating current, the frequency of which is equal to the speed of the shaft 80 in revolutions per second times the number of apertures in the disc.

It has already been postulated that the tracks are spaced 1.2 mils on centers. A convenient diameter of the capstan is in the neighborhood of a quarter-inch. In the present case the actual diameter is 0.252 inch, which would advance the tape 660 tracks or 110 picture lines per capstan revolution. In this case the number of holes in the tachometer disc is 110, so that the pilot frequency generated is equal to the line frequency. The tachometer signal thus generated is increased in amplitude in amplifier 89, and then passed through switch 90 (from the opposite position from that shown in the figure) to a phase discriminator 91. In the phase discriminator it is compared with the line frequency signal from the sync generator 75 to develop an error signal, which, amplified in servo amplifier 93, controls the motor speed.

Another portion of the signal from amplifier 89 goes by way of switch 90' to the head 73 to be recorded on the tape.

On playback the signal picked up by the head 73 is amplified in amplifier 95, and thence passes through switch 90'', which is also ganged with switch 90 through a phase adjuster 97. Thence it passes through switch 90 to the phase discriminator 91 where it serves the same purpose in regulating the motor speed on playback as the tachometer signal did in recording.

It will be recognized that the difference in tape speed recording and playback will be very minute, corresponding merely to the change in dimension of the tape between the two processes.

The use of the phase adjuster 97 is to permit recording and reproduction to be made on different pieces of equipment, where the relationship between the pilot head and the main head is not precisely the same, and also to compensate for any difference in phase delay between the pilot and signal channels.

It is to be understood that the arrangement shown in FIG. 6 is a relatively simple one. It is capable of quite rigid control of the tape but it can be modified or replaced to give much more accurate control. For example, the frequency multiplier can be included in the circuit between the photocell 87 and the switch 90, and the six-times line frequency used as a pilot instead of the line frequency itself. For still greater accuracy of control the arrangement disclosed in my copending application Serial No. 698,627, filed November 25, 1957, can be used. The application Serial No. 698,627 is now abandoned with its subject matter now part of the continuation application Serial No. 790,769, filed on February 2, 1959. Such refinements as this are not shown because they do not relate to the invention here claimed except to show that it is possible to maintain the necessary registration between the tracks and the pulses in the head during the playback operation.

It has been mentioned that either positive or negative magnetostriction may be used to accomplish the recording and reproduction in accordance with this invention. In FIG. 8 there is illustrated a transducer head wherein the negatively magnetostrictive nickel is used in place of the positively magnetostrictive permalloy.

Aside from the material employed for the tube 1', the structure may be very nearly identical with that illustrated in the first figure. The matching section 5, crystal 7, annulus 9 and rubber annulus 11 may be identical. The strut 21', however, passes through cap 13' and the end of the strut is threaded to receive an adjusting nut 15'. At the receiving end of the line the strut is threaded or sweated into a cap 17'. This places the strut in tension instead of compression and stresses the tube 1' in compression. The actuating pulses are applied in opposite phase to that required for the transducer head of FIG. 1. Otherwise the effects produced are substantially identical and therefore no detailed description is believed to be necessary.

Structurally, the arrangement of FIG. 8 is preferable to that of FIG. 1. Actually it is not quite as sensitive because of the fact that the nickel does not have the degree of permeability possessed by the permalloy 68. Its greater ruggedness and ease of construction may, however, dictate its use in certain circumstances, its value lying in the fact that no junctions between dissimilar materials are in tension. It has the additional minor disadvantage that the velocity of propagation of the elastic waves in nickel is very slightly lower than that in permalloy but in most applications this is immaterial.

Other modifications of the structures shown will doubtless occur to those skilled in the art. For example, a magnetostrictive drive can be used instead of a crystal to excite the elastic pulses in the head. The pulses traveling away from the line may be damped out by an absorber instead of being effectively cancelled by reflection in reverse phase. Furthermore, any specific frequency or dimensions in the present specification are intended to be illustrative only. All intended limitations in the scope of this invention are expressed in the claims that follow.

I claim:

1. A transducer head for the magnetic recording and reproduction of electrical signals comprising a tube of magnetostrictive material having a longitudinal non-magnetic gap extending through one wall thereof, a signal winding disposed to induce a circumferential magnetic field in said tube, means for stressing said tube to cause magnetostrictive reduction in permeability circumferentially thereof, means at one end of said tube for exciting therein elastic pulse waves of opposite sign to the stress imposed by said stressing means, and means at the other end of said tube for absorbing said pulse waves.

2. A transducer head for the magnetic recording and reproduction of electrical signals comprising a tube of magnetostrictive material having a non-magnetic gap extending longitudinally thereof, signal winding on said tube extending longitudinally therethrough, means for stressing said tube to cause magnetostrictive reduction in its permeability circumferentially thereof, a piezoelectric crystal interposed between said tube and said stressing means, means for electrically exciting said crystal to excite pulse waves of opposite stress to be transmitted longitudinally through said tube, and means at the opposite end of said tube for absorbing said pulse waves.

3. A transducer head as defined in claim 1 wherein said signal winding comprises an insulating film deposited on the surface of said tube and a metallic layer deposited on said film to form a single turn winding.

4. A transducer head for the magnetic recording and reproduction of electrical signals comprising a tube of magnetostrictive material having a non-magnetic gap extending longitudinally thereof, a signal winding disposed on said tube for developing a circumferential magnetic flux therein, a strut extending longitudinally through said tube, a cap on one end of said tube bearing against said tube and said strut and rigidly secured to at least one thereof, a cap assembly on the other end of said tube comprising an end block, an adjusting screw mounted through said end block and a piezoelectric crystal, said cap assembly bearing against said tube and strut and rigidly secured to the same one thereof to which said cap is rigidly secured, means for applying electric pulses to said piezoelectric crystal to excite elastic pulses therein to be transmitted along said tube and means at the other end of said tube for absorbing said elastic pulses.

5. A transducer head as defined in claim 4 including, in addition, a frusto-conical tubular section interposed between said piezoelectric crystal and said tube and tapering toward said tube to impose a greater unit stress upon said tube than that imposed upon said piezoelectric crystal.

6. A transducer head as defined in claim 4 including in addition, means interposed between said crystal and said strut for absorbing elastic waves transmitted toward said strut through said cap assembly.

7. A transducer head for the magnetic recording and reproduction of electric signals comprising a tube of positively magnetostrictive material having a non-magnetic gap extending longitudinally along the wall thereof, a signal winding so disposed as to excite a circumferential magnetic flux in said tube, means for applying a tensional stress to said tube of sufficient magnitude to reduce the circumferential permeability thereof to a value approaching unity, means at one end of said tube for developing therein compressive elastic pulse waves, and means at the opposite end of said tube for absorbing said waves.

8. A transducer head for the magnetic recording and reproduction of electrical signal comprising a tube of positively magnetostrictive material having a non-magnetic gap extending through the wall thereof longitudinally of said tube, a signal winding so disposed on said tube as to develop circumferential magnetic fields therein, a strut extending longitudinally through said tube, a cap on one end of said tube rigidly secured thereto and bearing against said strut, a cap assembly mounted on the other end of said tube and comprising an end block and an adjustment screw threaded axially through said end block and bearing against said strut, and a piezoelectric crystal adhesively secured between said cap assembly and said tube to tension said tube as said strut is compressed by advancing said adjusting screw into said end block.

9. A transducer head for the magnetic recording and reproduction of electrical signals comprising an elongated tubular acoustic transmission line of magnetostrictive material having a non-magnetic gap through the wall thereof extending longitudinally of said transmission line, a winding disposed to establish a circumferential magnetic field across said gap, means for stressing said transmission line to reduce the circumferential permeability thereof substantially to unity, means at one end of said line for developing therein traveling elastic waves of pulse form and of such sign and magnitude as to produce regions of opposite stress traveling therealong, and means at the other end of said transmission line for dissipating said waves.

10. A transducer head for magnetically recording and reproducing electrical signals comprising an elongated tubular acoustic transmission line of magnetostrictive material having a non-magnetic gap through the wall thereof substantially parallel to the axis of said line, a signal winding disposed to develop circumferential magnetic fluxes across said gap, means for stressing said line to reduce its circumferential permeability to a value approaching unity, means at one end of said line for exciting longitudinal elastic pulse waves therein of opposite sign to the stress developed by said stressing means, a tapered section interposed between said pulse exciting means and said line for matching the acoustic impedances thereof, means at the other end of said line for absorbing said pulse waves, and means at said one end of said line for preventing reflected pulse waves of like sign to those developed by said exciting means from reaching said line.

11. In a recording and reproducing system for transferring information to and from a storage member, a transducing member disposed relative to the storage member and constructed to obtain a transfer of information between the storage and transducing members at successive positions along the transducing member, means coupled to the transducing member for continuously stressing said transducing member to apply a disabling condition to the transducing member to inhibit the transfer of information between said transducing member and the storage member, means coupled to said transducing member for applying an enabling wave to said transducing member for passage through said transducing member to enable a transfer of information between the transducing member and the storage member at successive positions along the transducing member in accordance with the passage of the wave through the transducing member, and means coupled to the transducing member for obtaining a transfer of information between the storage member and the transducing member at the enabled position of the transducing member.

12. The system set forth in claim 11 in which the transducing member is a tube made of magnetostrictive material and in which the disabling means changes the permeability of the tube.

13. A transducer head for providing a transducing action between the head and a storage member movable in a first direction relative to the head, including, a first member positioned in contiguous relationship to the storage member in a direction transverse to the first direction and provided with a gap in the transverse direction in contiguous relationship to the storage member, means coupled to the first member for stressing the first member in the first direction to disable the member, means coupled to the first member for providing in said member a wave moving in the transverse direction along the member to enable the first member at the transverse position of the wave, and means coupled to the first member for generating a flux in said first member to obtain a transfer of information between the first member and the storage member at the enabled position of the first member at successive instants of time.

14. The transducer head set forth in claim 13 in which the first member is a tube and in which the generating means is coupled to the tube to generate a circumferential flux in the tube.

15. In a recording and reproducing system for transferring information to and from a storage member, a magnetic transducing member disposed in a first direction relative to the storage member, means coupled to the transducing member for continuously applying a stress to the transducing member to provide a disabling condition in said transducing member by reducing the permeability of any paths through both said transducing member and said storage member and to inhibit the transfer of information between said transducing member and the storage member, means coupled to the transducing member for applying an enabling wave to said member in the first direction to change the permeability of the transducing member at the position of the wave and to enable a transfer of information between the storage member and the transducing member at successive positions along the transducing member in the first direction corresponding to the positions of changed permeability in the member, means coupled to the transducing member for producing a transfer of information between the storage member and the transducing member at the enabled position on the transducing member at each instant, and means for providing relative mottion between said storage member and said transducing member in a direction transverse to the first direction.

16. A transducer head for transfer of information between the head and a storage member, including, a tubular transducing member having a first permeability condition inhibiting the transfer of information between the transducing member and the storage member and having a second permeability condition enabling the transfer of information between the transducing member and the storage member, the transducing member being disposed in a first direction along the storage member and being provided with a gap in the first direction, the transducing member being disposed with the gap in contiguous relationship to the storage member in the first direction to obtain a passage of flux between the transducing member and the storage member upon the occurrence of a second permeability in the tubular member, means coupled to the tubular transducing member for stressing the transducing member to normally obtain the first permeability condition in the transducing member, means coupled to the transducing member for applying a wave to said member for travel along the member to relieve the stress in the transducing member and to produce the second permeability in the member at the position of the relieved stress for magnetically activating the member at the position of the wave, and means coupled to the transducing member for obtaining a passage of flux between the transducing member and the storage member at the activated position of the transducing member in representation of the information to be transferred.

17. In a recording and reproducing system for use with an information memory member, a thin-walled member having a gap disposed in contiguous relationship to the information memory member, means coupled to the thin-walled member for producing a stress in the member to provide a normally disabled condition in the member, means coupled to the thin-walled member for applying an enabling wave at one end of said member for passage through the member to relieve the stress in the member at successive positions along the member to enable the member at the positions of the relieved stress, and means for transferring information between said member and said memory at the successive positions along the path of said wave during the time that such positions are enabled by said wave.

18. A transducer head for magnetically recording and reproducing information on a magnetic surface, including, a first member provided with a gap positioned adjacent the magnetic surface along a longitudinal axis and constructed to serve as a delay line for the travel of a wave of magnetic flux through the delay line, means coupled to the first member for stressing the member to inhibit the flow of magnetic flux between the first member and the magnetic surface and across the gap means coupled to the first member for providing in said member an enabling wave to relieve the stress in the member at successive positions along the longitudinal axis of the member for the flow of flux between the magnetic surface and the first member at the relieved positions, means operatively coupled to the first member for providing in said member magnetic flux representing particular information and also having flux paths corresponding to the paths of the enabling wave of magnetic flux to produce an external flux linking said member with the magnetic surface at the position of the relieved stress in the member, and means for providing relative motion between said member and the magnetic surface in a direction transverse to said longitudinal axis.

19. The head set forth in claim 18 in which the first member is a thin-walled tube and is provided with a longitudinal gap adjacent the magnetic surface.

20. In a recording system for transferring information to a member movable in a first direction, a recording member provided with a gap positioned adjacent said movable member, means operatively coupled to the recording member for establishing in said recording member a record-enabling wave travelling in a direction transverse to the first direction, means operatively coupled to the recording member and the enabling means for providing an impedance match between the recording member and the enabling means, and means for effecting the transfer of information from said recording member to the movable member at each instant at the position of the record-enabling wave.

21. The system set forth in claim 20 in which the recording member is a magnetostrictive tube and in which the enabling means includes a crystal and in which the impedance matching means includes a tapered member disposed on the tube.

22. In a recording system for transferring information to or from a movable magnetic member, a thin-walled magnetostrictive transducing member positioned adjacent the movable member and having a non-magnetic gap extending through one wall thereof adjacent the moving member, means coupled to the thin-walled transducing member for normally disabling the transducing member from obtaining a transfer of information between the transducing member and the movable member, means coupled to said transducing member for establishing in said device an enabling wave travelling in a direction transverse to the direction of movement of the member, and means for effecting the continuous transfer of information between the movable member and said transducing member at the position of the enabling wave.

23. In a recording system for transferring to a storage member information in the form of a continuous uninterrupted varying signal, a normally disabled longitudinally extending recording member provided with a longitudinally extending gap disposed in contiguous relationship to the storage member, means operatively coupled to the recording member for stressing the member to normally disable the member, means coupled to said recording member for supplying to said recording member information in the form of a continuously variable signal, and means coupled to said recording member for applying to the member an enabling wave which travels longitudinally along said member to relieve the stress in the member at successive positions along the member and to obtain a continuous transfer of the information from the recording member to the storage member at the position of the relieved stress in the member.

24. A transducer head for the magnetic recording and reproduction of electrical signals from a storage member, including, a magnetostrictive member having a gap disposed in contiguous relationship to the storage member, means at one end of said member for inducing an elastic pulse wave travelling through the member to vary the permeability of said member along the path of the wave, means operatively coupled to the magnetostrictive member and to the inducing means for providing an impedance match between the magnetostrictive member and the inducing means, a source of variable electrical signals, and means coupled to said member and responsive to the variable electrical signals for producing in said member a variable magnetic field corresponding to said variable electrical signals and for inducing such signal only at the position of said wave.

25. A transducer head for the magnetic recording of electrical signals on a magnetic surface and for the reproduction of the electrical signals from the magnetic surface, including, a thin-walled magnetostrictive element having a gap abutting to the magnetic surface to facilitate an efficient transfer of information between the member and the surface, means at one end of said member for inducing an elastic pulse wave travelling through the member to vary the permeability of said member along the path of the wave, a source of variable electrical signals, and means magnetically coupled to said member and responsive to the variable electrical signals for inducing in said member a variable magnetic field corresponding to said variable electrical signals and for inducing such signal at the position of said wave.

26. A transducer head for magnetic recording and reproduction of electrical signals, including, a tube of magnetostrictive material having a longitudinal non-magnetic gap extending through one wall thereof for the transfer of magnetic information through the gap, a signal winding disposed relative to the tube to induce a magnetic field in said tube, means operatively coupled to the tube for stressing said tube to vary the magnetostrictive permeability of the tube, and means for exciting in said tube elastic pulse waves of opposite sign to the stress imposed by said stressing means to obtain changes in the permeability of the tube.

References Cited in the file of this patent

UNITED STATES PATENTS

| | | |
|---|---|---|
| 2,683,856 | Kornei | July 13, 1954 |
| 2,780,774 | Epstein | Feb. 5, 1957 |
| 2,921,989 | Serrell | Jan. 19, 1960 |